(12) United States Patent
Washizuka (10) Patent No.: US 10,625,377 B2
(45) Date of Patent: Apr. 21, 2020

(54) BONDING MEMBER AND METHOD FOR MANUFACTURING BONDING MEMBER

(71) Applicant: Murata Manufacturing Co., Ltd., Nagaokakyo-shi, Kyoto-fu (JP)

(72) Inventor: Seitaro Washizuka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 229 days.

(21) Appl. No.: 15/864,413

(22) Filed: Jan. 8, 2018

(65) Prior Publication Data

US 2018/0126494 A1 May 10, 2018

Related U.S. Application Data

(63) Continuation of application No. PCT/JP2016/080159, filed on Oct. 12, 2016.

(30) Foreign Application Priority Data

Nov. 5, 2015 (JP) ................................ 2015-217508

(51) Int. Cl.
  *B23K 35/00* (2006.01)
  *B23K 35/02* (2006.01)
  (Continued)

(52) U.S. Cl.
  CPC ........ *B23K 35/025* (2013.01); *B23K 35/0233* (2013.01); *B23K 35/262* (2013.01); *B23K 35/302* (2013.01)

(58) Field of Classification Search
  CPC .... B23K 35/0227; B23K 35/40; B23K 35/26; B23K 35/406; B23K 35/302;
  (Continued)

(56) References Cited

U.S. PATENT DOCUMENTS

| 3,426,420 A | 2/1969 | Grant et al. |
| 3,479,731 A | 11/1969 | Mantel et al. |

(Continued)

FOREIGN PATENT DOCUMENTS

| JP | S52-29656 U | 3/1977 |
| JP | S58-100992 A | 6/1983 |

(Continued)

OTHER PUBLICATIONS

Machine translation of JP-2013-212524A (no date available).*

(Continued)

*Primary Examiner* — Kiley S Stoner
(74) *Attorney, Agent, or Firm* — Arent Fox LLP (57) ABSTRACT

A bonding member having a container between a first foil and a second foil. The container includes metal particles having a melting point higher than a melting point of the first foil and a melting point of the second foil, a film material in which the metal particles are dispersed, and intermetallic compounds formed by a reaction between the first foil or the second foil and the metal particles. The first foil and the metal particles are bonded with the intermetallic compound interposed therebetween, and the second foil and the metal particles are bonded with the intermetallic compound interposed therebetween.

16 Claims, 7 Drawing Sheets

(51) Int. Cl.
*B23K 35/26* (2006.01)
*B23K 35/30* (2006.01)

(58) Field of Classification Search
CPC ............... B23K 35/262; B23K 35/025; B23K 35/0233; B23K 35/0222–025; B23K 1/00–206; C22C 9/06; C22C 13/02; C22C 13/00; C22C 9/00; H05K 3/3489; H05K 3/3457; H05K 2203/049; H05K 2203/0415; H05K 2203/0405
USPC ............... 228/245–262, 179.1–180.22, 56.3
See application file for complete search history.

(56) References Cited

U.S. PATENT DOCUMENTS

| | | | |
|---|---|---|---|
| 4,398,975 A * | 8/1983 | Ohsawa | C22C 28/00 148/400 |
| 5,597,656 A | 1/1997 | Carey et al. | |
| 5,965,197 A | 10/1999 | Jin et al. | |
| 6,186,390 B1 | 2/2001 | Tadauchi et al. | |
| 6,738,257 B1 | 5/2004 | Lai | |
| 7,516,548 B2 | 4/2009 | Twigg | |
| 8,152,953 B2 * | 4/2012 | Yoshimura | H05K 3/321 156/327 |
| 8,563,872 B2 * | 10/2013 | Hirai | H05K 3/4069 174/257 |
| 9,105,987 B2 * | 8/2015 | Nakano | C22C 22/00 |
| 2003/0196732 A1 | 10/2003 | Carey et al. | |
| 2004/0134966 A1 | 7/2004 | Chang et al. | |
| 2004/0211291 A1 | 10/2004 | Ono et al. | |
| 2005/0022975 A1 | 2/2005 | Rosenfeld et al. | |
| 2005/0022984 A1 | 2/2005 | Rosenfeld et al. | |
| 2005/0098609 A1 * | 5/2005 | Greenhut | B23K 35/001 228/122.1 |
| 2006/0061974 A1 * | 3/2006 | Soga | B23K 3/063 361/743 |
| 2006/0180296 A1 | 8/2006 | Liu | |
| 2007/0240854 A1 | 10/2007 | Liu et al. | |
| 2007/0277961 A1 | 12/2007 | Yu et al. | |
| 2008/0012131 A1 * | 1/2008 | Tanaka | H05K 3/3436 257/738 |
| 2008/0213614 A1 | 9/2008 | Wieres et al. | |
| 2010/0197534 A1 * | 8/2010 | Yuasa | B22F 7/004 508/103 |
| 2011/0068149 A1 * | 3/2011 | Hirano | B22F 1/025 228/56.3 |
| 2012/0156512 A1 * | 6/2012 | Nakano | B23K 1/00 428/457 |
| 2013/0233618 A1 | 9/2013 | Nakano et al. | |
| 2013/0270001 A1 * | 10/2013 | Nakano | B23K 35/262 174/84 R |
| 2013/0299236 A1 * | 11/2013 | Nakano | B23K 35/0238 174/84 R |
| 2014/0174605 A1 * | 6/2014 | Nakagawa | B22F 1/00 148/24 |
| 2014/0174706 A1 | 6/2014 | Yamada et al. | |
| 2014/0178703 A1 | 6/2014 | Nakano et al. | |
| 2014/0193650 A1 | 7/2014 | Nakano et al. | |
| 2014/0345939 A1 * | 11/2014 | Nakano | C22C 9/04 174/94 R |
| 2014/0356055 A1 * | 12/2014 | Nakano | C22C 9/00 403/271 |
| 2014/0363221 A1 * | 12/2014 | Nakano | B23K 1/00 403/272 |
| 2015/0034701 A1 * | 2/2015 | Takaoka | H01G 4/2325 228/101 |
| 2015/0072165 A1 * | 3/2015 | Sunaga | B23K 1/20 428/610 |
| 2015/0204617 A1 | 7/2015 | Thanhlong et al. | |
| 2016/0031027 A1 | 2/2016 | Chu et al. | |
| 2016/0240505 A1 | 8/2016 | Tatsumi et al. | |
| 2016/0288245 A1 | 10/2016 | Ishino et al. | |
| 2016/0297029 A1 * | 10/2016 | Ishino | B23K 20/002 |
| 2016/0338201 A1 * | 11/2016 | Kiyono | H01L 24/13 |
| 2017/0252872 A1 | 9/2017 | Hartmann | |
| 2018/0092258 A1 * | 3/2018 | Beers | B32B 27/08 |

FOREIGN PATENT DOCUMENTS

| | | |
|---|---|---|
| JP | S63-183772 A | 7/1988 |
| JP | H03-110392 A | 5/1991 |
| JP | H06-47579 A | 2/1994 |
| JP | H07-299591 A | 11/1995 |
| JP | H09-119789 A | 5/1997 |
| JP | 2001-205476 A | 7/2001 |
| JP | 2002-301588 A | 10/2002 |
| JP | 2004-174522 A | 6/2004 |
| JP | 2005-52856 A | 3/2005 |
| JP | 3110111 U | 6/2005 |
| JP | 2009-106993 A | 5/2009 |
| JP | 5018978 B1 | 9/2012 |
| JP | 2013-212524 A | 10/2013 |
| JP | 2014-180690 A | 9/2014 |
| JP | 2015-42421 A | 3/2015 |
| JP | 5685656 B1 | 3/2015 |
| JP | 2015-93295 A | 5/2015 |
| JP | 2015-135211 A | 7/2015 |
| JP | 2015-147989 A | 8/2015 |
| JP | 2015-166101 A | 9/2015 |
| WO | WO 98/33621 A1 | 8/1998 |
| WO | WO 2012/066795 A1 | 5/2012 |
| WO | WO 2013/038816 A1 | 3/2013 |
| WO | WO 2013/038817 A1 | 3/2013 |
| WO | 2015105088 A1 | 7/2015 |
| WO | WO 2015/105089 A1 | 7/2015 |

OTHER PUBLICATIONS

Machine translation of JP-2014-0180690A (no date available).*
Written Opinion of the International Searching Authority issued in International Application No. PCT/JP2016/080159, dated Dec. 6, 2016.
International Search Report issued in International Application No. PCT/JP2016/073532, dated Nov. 8, 2016.
International Search Report issued in International Application No. PCT/JP2016/075615, dated Nov. 15, 2016.
International Search Report issued in International Application No. PCT/JP2016/080159, dated Dec. 6, 2016.
Written Opinion of the International Searching Authority issued in International Application No. PCT/JP2016/073532, dated Nov. 8, 2016.
Written Opinion of the International Searching Authority issued in International Application No. PCT/JP2016/075615, dated Nov. 15, 2016.

* cited by examiner

ial application No. PCT/JP2016/080159, filed Oct. 12, 2016, which claims priority to Japanese Patent Application No. 2015-217508, filed Nov. 5, 2015, the entire contents of each of which are incorporated herein by reference.

BONDING MEMBER AND METHOD FOR MANUFACTURING BONDING MEMBER

CROSS REFERENCE TO RELATED APPLICATIONS

The present application is a continuation of International application No. PCT/JP2016/080159, filed Oct. 12, 2016, which claims priority to Japanese Patent Application No. 2015-217508, filed Nov. 5, 2015, the entire contents of each of which are incorporated herein by reference.

FIELD OF THE INVENTION

The present invention relates to a bonding member used for, for example, bonding an electronic component to a substrate and a method for manufacturing a bonding member.

BACKGROUND OF THE INVENTION

The applicant has developed a paste-like bonding member containing a low melting point metal and a high melting point metal (see, for example, Patent Document 1). When the bonding member is heated to a predetermined temperature, the low melting point metal is melted to react with the high melting point metal and thus to form an intermetallic compound having a melting point higher than that of the low melting point metal. When the intermetallic compound is formed, the amount of the low melting point metal or the high melting point metal is reduced, or additives such as a binder are evaporated and vaporized, so that a joint portion formed from the bonding member becomes a porous portion including many voids.

Meanwhile, a bonding member (see, for example, Patent Document 2) capable of providing a joint portion having a dense structure rather than porous structure has also been developed. The bonding member is formed into a sheet shape by rolling or hot pressing high melting point metal particles sandwiched between metal foils formed of low melting point metal to bind the high melting point metal particles. In a joint portion formed from the bonding member, the low melting point metal of the metal foil melts and fills voids of an intermetallic compound, so that it is possible to obtain a dense structure in which voids hardly remain. There is also a case where metal particles are caused to remain in a joint portion, thereby increasing the minimum thickness of the joint portion and securing a stand-off height of a component to be bonded (see, for example, Patent Document 3).

Patent Document 1: Japanese Patent No. 5018978
Patent Document 2: Japanese Patent Application Laid-Open No. 2002-301588
Patent Document 3: Japanese Patent Application Laid-Open No. 2013-212524

SUMMARY OF THE INVENTION

In a porous joint portion formed from the bonding member as in Patent Document 1, the strength, particularly the shear strength may decrease. On the other hand, in the bonding member as in Patent Document 2, the high melting point metal particles are bound to each other in a plastic deformed state, and therefore an area where the low melting point metal comes in contact with the high melting point metal is very small when the low melting point metal melts, so that the rate of formation reaction of the intermetallic compound becomes slow. Thus, a joint portion formed from the bonding member consequently has a heterogeneous structure in which the high melting point metal remains. In the joint portion having the heterogeneous structure in which the high melting point metal remains, minute Kirkendall voids are formed in the joint portion with the lapse of time due to a difference in rate of metal diffusion reaction between dissimilar metals. The growth of the Kirkendall voids may cause destruction of the joint portion.

Thus, in order to allow the joint portion formed from the bonding member to have a dense and homogeneous structure, it is considered to be effective that the paste-like bonding member as in Patent Document 1 is applied to a metal foil formed of a low melting point metal to form a coating film, and the coating film is sandwiched between other metal foils.

However, in the case of the configuration as described above, each of the metal foils and the coating film are bonded only with a weak adhesive force such as van der Waals force, so that the metal foil is easily peeled.

Accordingly, an object of the present invention is to provide a bonding member that easily gives a joint portion having a dense and homogeneous structure and that hardly causes peeling of a metal foil, and a method for manufacturing the bonding member.

A bonding member according to the present invention includes a first layer including a first metal body; a second layer including a second metal body; and a third layer provided between the first layer and the second layer. In this bonding member, the third layer includes particles of a third metal body having a melting point higher than a melting point of the first metal body and a melting point of the second metal body; a film material in which the particles of the third metal body are dispersed; and an intermetallic compound formed by a reaction between the first metal body and the third metal body or a reaction between the second metal body and the third metal body. The first metal body and the particles of the third metal body are bonded with the intermetallic compound interposed between the first metal body and the particles of the third metal body, and the second metal body and the particles of the third metal body are bonded with the intermetallic compound interposed between the second metal body and the particles of the third metal body.

In the present disclosure, the terms "first metal body", "second metal body" and "third metal body" do not refer to metal elements, respectively, but are defined as terms referring to an alloy that is a solid solution or an intermetallic compound or a metal body formed of a simple metal element.

In this above-noted configuration, the particles of the third metal body are dispersed in the film material in the third layer sandwiched between the first layer and the second layer, so that when a joint portion is formed from the bonding member, it is possible to increase an area where the first metal body or the second metal body melts to contact with a surface of the third metal body. Consequently, the rate of formation reaction of the intermetallic compound is increased, the third metal body hardly remains in the joint portion formed from the bonding member, and the homogeneity of the joint portion is enhanced.

In addition, even when voids are formed in the third layer during the formation of the joint portion from the bonding member, the first metal body or the second metal body melts and fills the voids, so that the compactness of the joint portion is enhanced.

In addition, the first metal body and the third metal body are bonded with the intermetallic compound interposed therebetween and the second metal body and the third metal body are bonded with the intermetallic compound interposed therebetween, so that the first layer and the second layer are hardly peeled from the third layer.

The film material preferably contains a flux. This removes an oxide film on a surface of each of the particles of the third metal body when the joint portion is formed from the bonding member, and improves the rate of formation reaction of the intermetallic compound. Accordingly, the third metal body is further less likely to remain in the joint portion formed from the bonding member.

It is preferable that the particles of the third metal body have an average particle size (D90) of not less than 0.1 μm and not more than 45 μm. This can also convert the center portion of each of the particles to the intermetallic compound, and the third metal body is further less likely to remain in the joint portion formed from the bonding member.

In addition, it is preferable that the first metal body is one of Sn pure metal and a Sn alloy, the second metal body is one of Sn pure metal and a Sn alloy, and the third metal body is one of a Cu—Ni alloy and a Cu—Mn alloy. Consequently, the rate of formation reaction of the intermetallic compound can be particularly increased, and the third metal body is further less likely to remain in the joint portion formed from the bonding member.

In addition, it is preferable that the third layer further includes particles of one of Sn pure metal and a Sn alloy. Consequently, formation of the intermetallic compound is promoted not only in regions which are each close to the first layer and the second layer in the third layer, but also in a region between the above regions, so that the first layer and the second layer are more hardly peeled from the third layer.

A method for manufacturing a bonding member according to the present invention includes preparing a first foil including a first metal body, a second foil including a second metal body, and a paste including particles of a third metal body having a melting point higher than a melting point of the first metal body and a melting point of the second metal body, the particles of the third metal body being dispersed in a film material; applying the paste to at least one of the first foil and the second foil; sandwiching the paste between the first foil and the second foil; and heating at least one of the first foil and the second foil to a temperature lower than the melting points of the first metal body and the second metal body to react the particles of the third metal body with at least one of the first metal body and the second metal body and to form an intermetallic compound.

It is preferable that when the intermetallic compound is formed, a pressure is applied between the first foil and the second foil to plastically deform the first foil and the second foil. This increases a contact area between the first foil or the second foil and the particles of the third metal body, and further improves the rate of formation reaction of the intermetallic compound.

When the paste is prepared, it is preferable that the particles of the third metal body dispersed in the film material have an average particle size (D90) of not less than 0.1 μm and not more than 55 μm. This makes it easy to set the average particle size (D90) of the particles of the third metal body in a state of the bonding member within the numerical range described above.

According to the bonding member of the present invention, when the joint portion is formed from the bonding member, the first metal body or the second metal body melts and fills voids and, at the same time, the area where the first metal body or the second metal body can be in contact with the surface of each of the particles of the third metal body increases, so that a joint portion with high compactness and high uniformity can be obtained. In addition, the first metal body and the third metal body are bonded with the intermetallic compound interposed therebetween and the second metal body and the third metal body are bonded with the intermetallic compound interposed therebetween, so that the first layer and the second layer are hardly peeled from the third layer.

DETAILED DESCRIPTION OF PREFERRED EMBODIMENTS OF THE INVENTION

Hereinafter, a bonding member according to a first embodiment of the present invention and a method for manufacturing the bonding member will be described.

Figure 1:
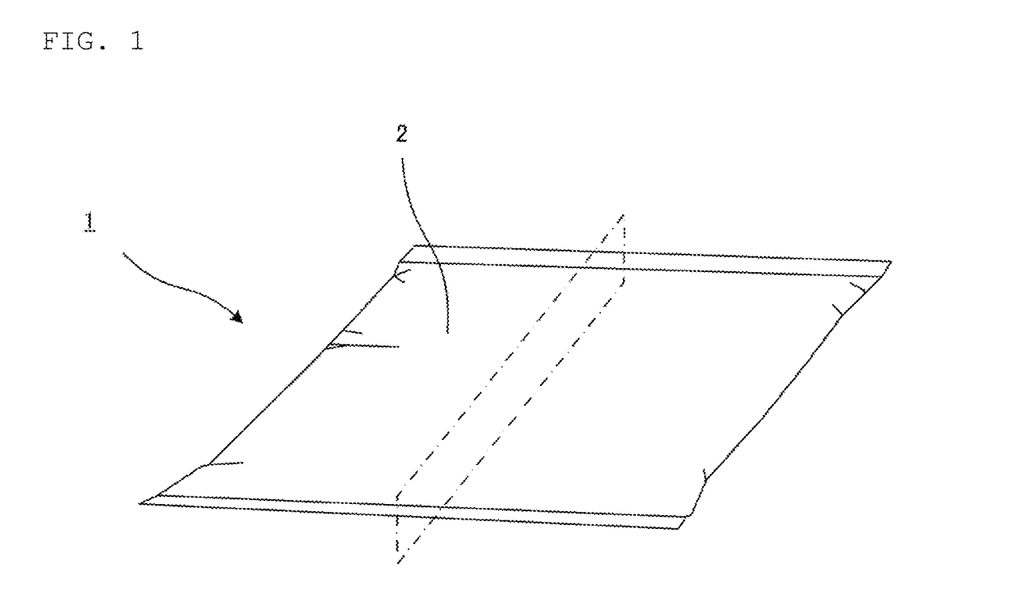
FIG. 1 is a perspective view of a bonding member according to a first embodiment of the present invention.
Figure 2:
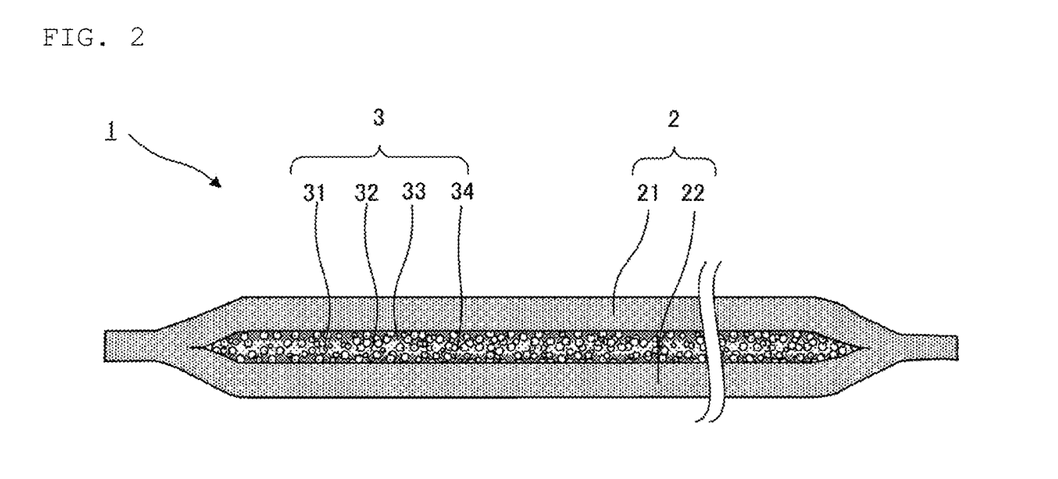
FIG. 2 is a schematic cross-sectional view of the bonding member according to the first embodiment of the present invention.
Figure 3A:
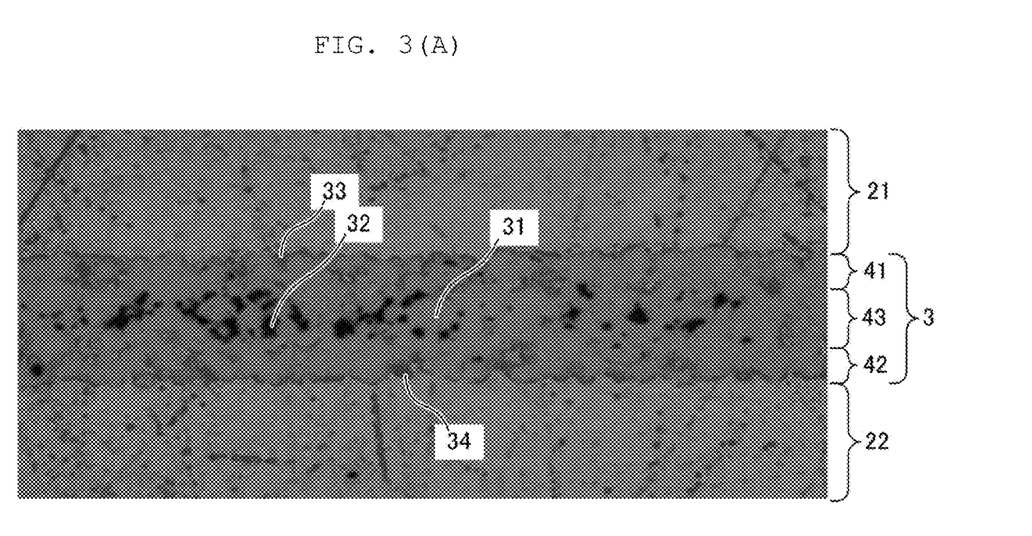
FIG. 3(A) is a microscopic image of the bonding member according to the first embodiment of the present invention.

FIG. 1 is a perspective view of a bonding member 1 according to a first embodiment of the present invention. FIG. 2 is a schematic cross-sectional view of the bonding member 1. FIG. 3(A) is a microscopic image when viewing a sample cross section of the bonding member 1.

The bonding member 1 includes a package 2 and a container 3.

The package 2 includes a first foil 21 and a second foil 22. The first foil 21 and the second foil 22 each are thin and flexible, and have a rectangular shape as viewed from the thickness direction. An outer edge portion of the first foil 21 and an outer edge portion of the second foil 22 as viewed from the thickness direction are adhered to each other.

The first foil 21 corresponds to a first layer of the bonding member 1. The second foil 22 corresponds to a second layer of the bonding member 1. The first foil 21 is entirely constituted of a first metal body. The first metal body is, for example, Sn pure metal or a Sn-based alloy. The second foil 22 is entirely constituted of a second metal body. The second metal body is, for example, Sn pure metal or a Sn-based alloy. Examples of the Sn-based alloy include Sn-3Ag-0.5Cu, Sn-3.5Ag, Sn-5Ag, Sn-0.7Cu, Sn-0.75Cu, Sn-58Bi, Sn-52In, Sn-0.7Cu-0.05Ni, Sn-5Sb, Sn-2Ag-0.5Cu-2Bi, Sn-57Bi-1Ag, Sn-3.5Ag-0.5Bi-8In, Sn-9Zn, and Sn-8Zn-3Bi.

In the above notation, for example, "Sn-3Ag-0.5 Cu" indicates that it is an alloy containing 3% by weight of Ag and 0.5% by weight of Cu and the balance being Sn.

The composition of the first metal body and the composition of the second metal body may be the same or different from each other. In addition, the compositions of the first metal body and the second metal body are not limited to the compositions exemplified above as long as they satisfy a relationship with a third metal body described later. In the sample shown in FIG. 3(A), Sn pure metal (Sn foil: The Nilaco Corporation) having a thickness of 100 μm and a purity of 99.9% is used as the first foil 21 and the second foil 22.

The container 3 corresponds to a third layer of the bonding member 1. For example, the container 3 has a thickness of about half the thickness of the first foil 21 or the second foil 22 (for example, 50 μm), and is provided inside the package 2.

The container 3 includes metal particles 31, a film material 32, and intermetallic compounds 33 and 34. The metal particles 31 are dispersed in the container 3 while being buried in the film material 32 and the intermetallic compounds 33 and 34. More specifically, as shown in FIG. 3(A), the intermetallic compound 33 is concentratedly distributed in a first region 41 close to the first foil 21 of the container 3. The intermetallic compound 34 is concentratedly distributed in a second region 42 close to the second foil 22 of the container 3. The film material 32 is concentratedly distributed in a third region 43 sandwiched between the first region 41 and the second region 42 of the container 3. The metal particles 31 are distributed so as to be surrounded by the intermetallic compound 33 in the first region 41, distributed so as to be surrounded by the intermetallic compound 34 in the second region 42, and distributed so as to be surrounded by the film material 32 in the third region 43.

Each of the metal particles 31 is entirely constituted of the third metal body. The third metal body has a melting point higher than those of the first metal body and the second metal body described above and reacts with the first metal body and the second metal body to form an intermetallic compound. For example, the third metal body is a metal body of a Cu-based alloy. The Cu-based alloy is, for example, a Cu-10 Ni alloy, a Cu—Ni alloy having a proportion of Ni of 5 to 20% by weight, a Cu—Mn alloy having a proportion of Mn of 5 to 20% by weight, a Cu—Cr alloy or Cu—Al alloy. Among them, a Cu—Ni alloy and a Cu—Mn alloy are particularly preferable materials because they have a high reaction rate when forming intermetallic compounds with Sn pure metal or Sn-based alloy. The third metal body may be another metal body as long as it has a melting point higher than those of the first metal body and the second metal body described above and reacts with the first metal body and the second metal body to form an intermetallic compound. Further, the third metal body may contain a third component such as Ag, Au, Al, Bi, C, Co, Cu, Fe, Ga, Ge, In, Mn, Mo, Ni, P, Pb, Pd, Pt, Si, Sb, or Zn. However, it is desirable that the third metal body does not contain a metal element common to the first metal body and the second metal body, particularly Sn. In the sample shown in FIG. 3(A), particles of Cu-10 Ni alloy are used as the metal particles 31. The metal particles 31 in a state of a starting raw material powder have an average particle size (D90) of about 53 μm, and have an average particle size (D90) obtained by image analysis on the microscopic image of about 42 μm. The definition of the average particle size will be described later.

The intermetallic compounds 33 and 34 each are formed by reacting the first metal body or the second metal body with the third metal body and have a melting point higher than those of the first metal body and the second metal body. The intermetallic compounds 33 and 34 are formed of, for example, a Cu—Sn-based alloy. More specifically, when the metal particles 31 are formed of a Cu—Ni alloy, the intermetallic compounds 33 and 34 are formed of $(Cu,Ni)_6Sn_5$, $Cu_4Ni_2Sn_5$, $Cu_5NiSn_5$, $(Cu,Ni)_3Sn$, $Cu_2NiSn$, $CuNi_2Sn$, or the like. When the metal particles 31 are formed of a Cu—Mn-based alloy, the intermetallic compounds 33 and 34 are formed of $(Cu,Mn)_6Sn_5$, $Cu_4Mn_2Sn_5$, $Cu_5MnSns$, $(Cu,Mn)_3Sn$, $Cu_2MnSn$, $CuMn_2Sn$, or the like.

The film material 32 is formed of at least a material that reacts with the first metal body, the second metal body, the third metal body or the like to disappear when a joint portion is formed from the bonding member 1, or a material evaporated or decomposed by heat. For example, the film material 32 contains a flux. When the film material 32 contains a flux, surface oxide films of the metal particles 31, the intermetallic compounds 33 and 34, the first foil 21, and the second foil 22 can be removed and efficiently reacted during forming the joint portion from the bonding member 1. Further, when the film material 32 contains a flux, an appropriate viscosity can be imparted to the film material 32, and during from application of the film material 32 to melting of the flux, it is possible to exert the effect of enhancing the binding properties between the metal particles 31 and the effect of enhancing the adhesiveness of the film material 32 to the first metal body or the second metal body. As the flux, it is possible to adopt appropriate rosin materials such as natural rosin, rosin derivatives such as hydrogenated rosin, disproportionated rosin, polymerized rosin, unsaturated dibasic acid modified rosin, and acrylic acid modified rosin, and a mixture thereof. In the sample shown in FIG. 3(A), a polymerized rosin (R-95: Arakawa Chemical Industries, Ltd.) is used to adjust the weight ratio of Cu-10 Ni alloy and polymerized rosin to 90:5.

Further, the film material 32 may contain an activator for accelerating the reaction of the flux.

As the activator, it is possible to adopt appropriate activator materials such as monocarboxylic acids (e.g., formic acid, acetic acid, lauric acid, palmitic acid, stearic acid, benzoic acid, etc.), dicarboxylic acids (e.g., oxalic acid, malonic acid, succinic acid, glutaric acid, adipic acid, suberic acid, azelaic acid, sebacic acid, phthalic acid, etc.), bromoalcohols (e.g., 1-bromo-2-butanol, etc.), hydrohalogenic acid salts of organic amines, bromoalkanes, bromoalkenes, benzyl bromides, polyamines, and a chlorine-based activator. The film material 32 may, if necessary, contain an organic additive such as resin, thixo agent, thermosetting resin, antioxidant, flame retardant, dispersant, leveling agent, defoaming agent, delustering agent, or plasticizer. In addition, the film material 32 may contain voids.

The bonding member 1 may contain Ag, Au, Al, Bi, C, Co, Cu, Fe, Ga, Ge, In, Mn, Mo, Ni, P, Pb, Pd, Pt, Si, Sb, Zn and the like. They may be added as impurities contained in the metal particles 31, the film material 32, the intermetallic compounds 33 and 34, the first foil 21, and the second foil 22 or may be added separately as metal powders, a metal film, or the like. They may be contained in the form of a metal complex or a metal compound.

In the bonding member 1 of the present embodiment having the configuration as described above, the first foil 21 and the metal particles 31 are bonded with the intermetallic compound 33 interposed therebetween, and the second foil 22 and the metal particles 31 are bonded with the intermetallic compound 34 interposed therebetween. More specifically, strong binding mainly due to metal bonding is achieved between the first foil 21 and the intermetallic compound 33, between the intermetallic compound 33 and the metal particle 31, between the second foil 22 and the intermetallic compound 34, and between the intermetallic compound 34 and the metal particle 31.

Figure 3B:
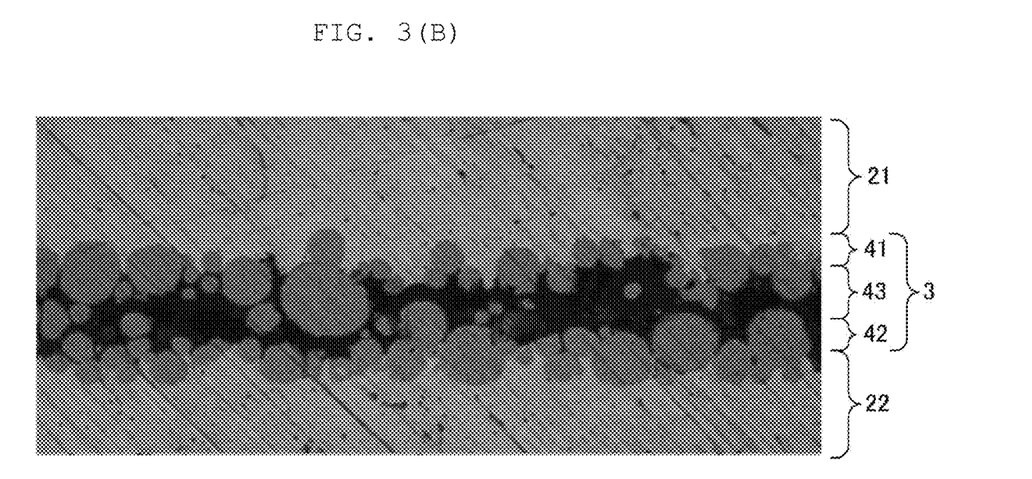
FIG. 3(B) is a microscopic image of a bonding member for comparison.

FIG. 3(B) is a microscopic image showing a sample cross section of a bonding member for comparison. In the bonding member for comparison, the first foil 21 and the second foil 22 are pressure bonded to the container 3 without heating during manufacturing, and the bonding member has a configuration example in which an intermetallic compound is not formed. In such a case, bonding is given between the first foil 21 and the metal particles 31 and between the second foil 22 and the metal particles 31 by van der Waals force or an anchor effect; however, the adhesive force is weaker than the adhesive force by metal bonding.

Accordingly, as compared with a case where the intermetallic compounds 33 and 34 are not formed like the bonding member for comparison, the first foil 21 and the second foil 22 are hardly peeled off in the bonding member 1 according to the present embodiment.

Figure 4:
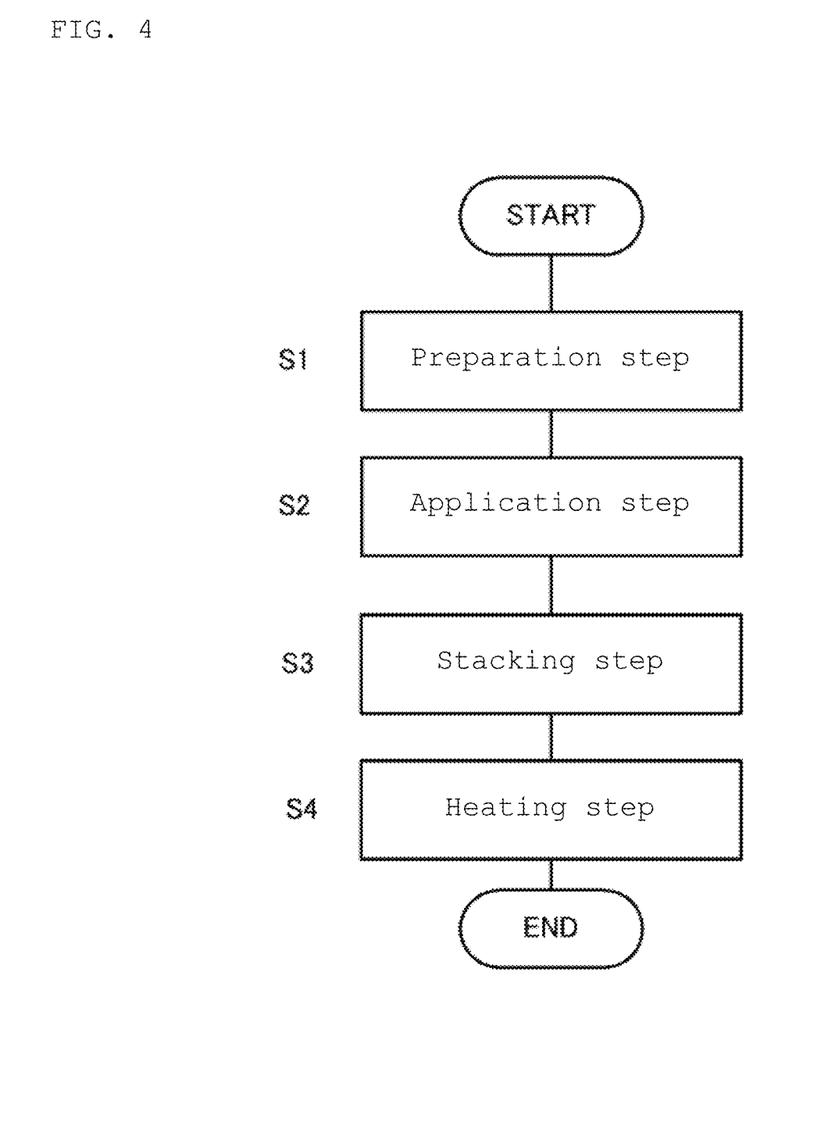
FIG. 4 is a diagram showing a flowchart of a method for manufacturing the bonding member according to the first embodiment of the present invention.
Figure 5A:
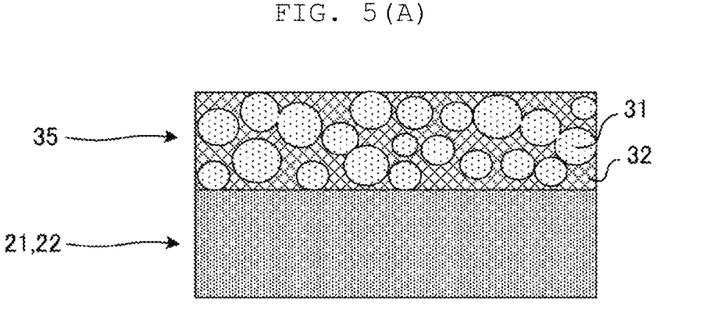
FIGS. 5(A) to 5(C) are schematic views for explaining a process of manufacturing the bonding member according to the first embodiment of the present invention.
Figure 5B:
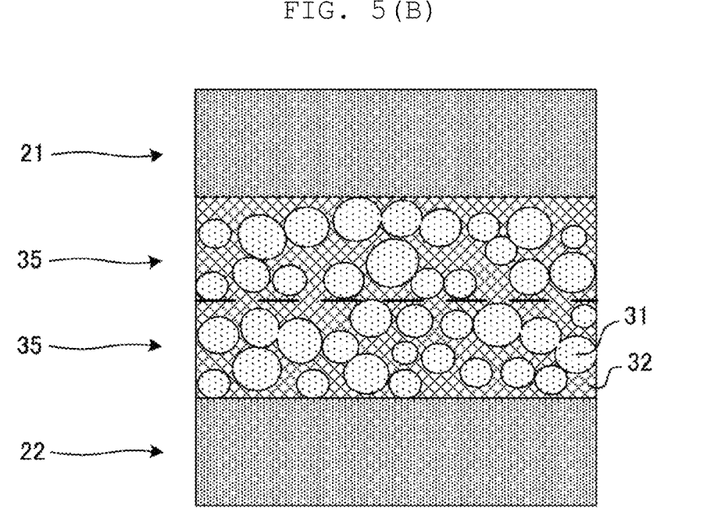
Figure 5C:
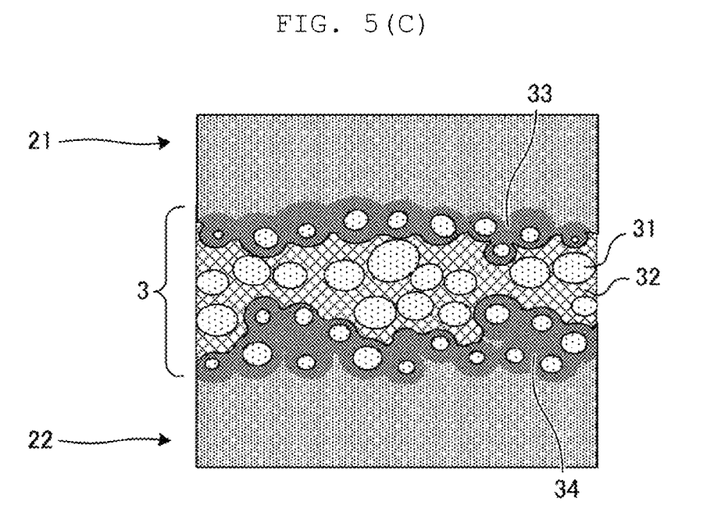

Next, a method for manufacturing the bonding member 1 according to the present embodiment will be described. FIG. 4 is a flowchart showing the method for manufacturing the bonding member 1 according to the present embodiment. FIGS. 5(A) to 5(C) are schematic views each showing a process of manufacturing the bonding member 1.

As shown in FIG. 4, the method for manufacturing the bonding member 1 according to the present embodiment sequentially performs a preparation step S1, an application step S2, a stacking step S3, and a heating step S4.

In the preparation step S1, the first foil 21 and the second foil 22 in a state of being separated from each other and a paste serving as the container 3 are prepared. The paste is obtained by adding a solvent to the film material 32 (containing a flux) to lower its viscosity and kneading with the metal particles 31. That is, the paste is obtained by dispersing the metal particles 31 in the film material 32. In the above sample, hexyl diglycol is used as a solvent, and the weight ratio of Cu-10 Ni alloy, polymerized rosin, and solvent is set to 90:5:5.

In the application step S2, as shown in FIG. 5(A), the paste is applied to one surface of each of the first foil 21 and the second foil 22 by using a doctor blade method or the like to be heated in a hot air oven, a reflow furnace, or the like and to evaporate the solvent, whereby the paste is dried to obtain a coating film 35.

It is desirable that this step is performed at a temperature lower than the melting points of the first foil 21 and the second foil 22 (231.9° C. in the case of the Sn pure metal shown in the above sample) or a temperature at which the flux softens (about 100° C. in the case of the polymerized rosin shown in the above sample), for example, approximately 90° C.

In the stacking step S3, as shown in FIG. 5(B), a surface of the first foil 21 to which the coating film 35 is provided and a surface of the second foil 22 to which the coating film 35 is provided are arranged so as to face each other, and the first foil 21 and the second foil 22 are stacked while sandwiching these coating films 35 therebetween. At this time, it is preferable that the outer edge portions of the first foil 21 and the second foil 22 may be directly bonded by using an adhesive or welding with heat.

In the heating step S4, a laminate of the first foil 21, the second foil 22, and the paste 35 is heated by hot air oven, reflow furnace, hot plate or the like. The heating temperature at this time is preferably higher than a temperature at which the flux contained in the coating film 35 melts (about 160° C. in the case of the polymerized rosin shown in the above sample) and lower than the melting points of the first foil 21 and the second foil 22 (231.9° C. in the case of the Sn pure metal shown in the above sample). For example, the heating temperature is set to 200 to 220° C., and heating may be performed for approximately 1 minute. It is preferable to set the heating temperature and the heating time such that at least a portion of the film material 32 remains after heating.

Consequently, as shown in FIG. 5(C), the first metal body constituting the first foil 21 partially reacts with the metal particles 31 in the vicinity of the first foil 21, and the intermetallic compound 33 is formed on the surfaces of the metal particles 31 in the vicinity of the first foil 21 and their surroundings. On the other hand, the second metal body constituting the second foil 22 partially reacts with the metal particles 31 in the vicinity of the second foil 22, and the intermetallic compound 34 is formed on the surfaces of the metal particles 31 in the vicinity of the second foil 22 and their surroundings.

Consequently, as described above, the first foil 21 and the metal particles 31 are firmly bonded with the intermetallic compound 33 interposed therebetween and the second foil 22 and the metal particles 31 are firmly bonded with the intermetallic compound 34 interposed therebetween, so that the first foil 21 and the second foil 22 are less likely to be peeled off.

In the heating step, more preferably, the first foil 21 and the second foil 22 are plastically deformed by pressurizing the first foil 21, the second foil 22, and the container 3 so as to crush them in the thickness direction. For example, the pressure at this time may be preferably 50 kN (equivalent to 125 MPa) in the configuration shown in the above sample. When pressurizing is performed in this manner, some of the metal particles 31 can be buried in the first foil 21 and the second foil 22 to increase the contact area and to increase the formation rate and formation amount of the intermetallic compounds 33 and 34. Thus, firmer bonding can be realized.

The bonding member 1 of the present embodiment is manufactured through these steps S1 to S4. In the above manufacturing method, although an example has been shown in which the coating material is formed into a coating film from the paste state, the coating material in the paste state may be stacked between metal foils, for example. In addition to the above examples, the heating method may be realized through far infrared heating, high frequency induction heating, or the like. In addition, the heating atmosphere may be any of atmospheric air, vacuum, and a gas such as $N_2$, $H_2$, or formic acid.

The bonding member 1 manufactured by the manufacturing method described above is used for, for example, bonding an electrode of an electronic component to an electrode of a substrate. Specifically, a flux or the like is applied to each of opposed electrodes to be bonded, and the bonding member 1 is disposed between the opposed electrodes. Then, the bonding member 1 is heated to a temperature exceeding the melting points of the first metal body and the second metal body. In this way, the bonding member 1 is melted and hardened to form a joint portion 5, and the opposed electrodes are bonded with the joint portion 5 interposed therebetween.

Here, the reaction that occurs when the joint portion 5 is formed from the bonding member 1 will be described.

Figure 6A:
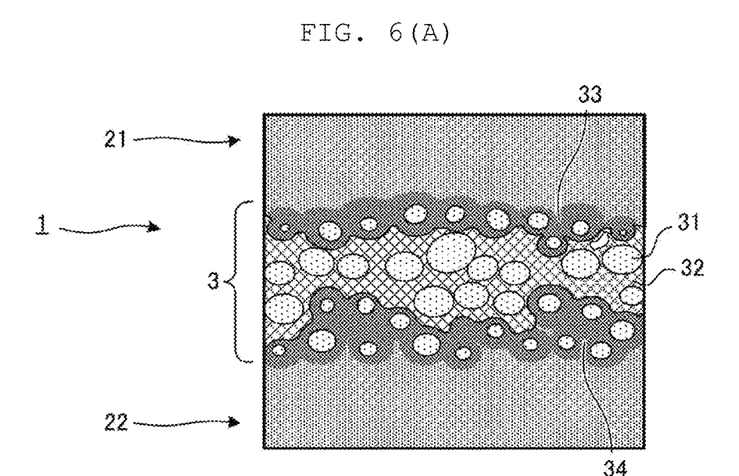
FIGS. 6(A) to 6(D) are schematic views for explaining a reaction during a joint portion is formed from the bonding member according to the first embodiment of the present invention.
Figure 6B:
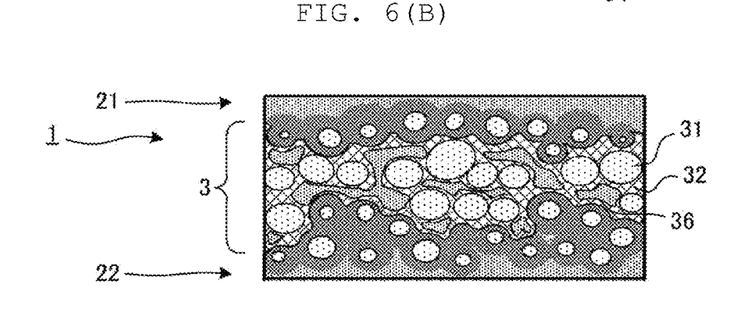

FIG. 6(A) is a schematic view showing a state before heating of the bonding member 1. FIG. 6(B) is a schematic view showing a state in which the first metal body and the second metal body start melting by heating.

As shown in FIG. 6(B), when the bonding member 1 is heated to a temperature exceeding the melting points of the first metal body and the second metal body, the first foil 21, the second foil 22, and the film material 32 melt. Consequently, the flux contained in the film material 32 removes a surface oxide film of each of the metal particles 31 dispersed in the film material 32. The film material 32 is thus consumed and gasified, and voids 36 are formed in the film material 32. Melts of the first foil 21 and the second foil 22 flow into the void 36.

Figure 6C:
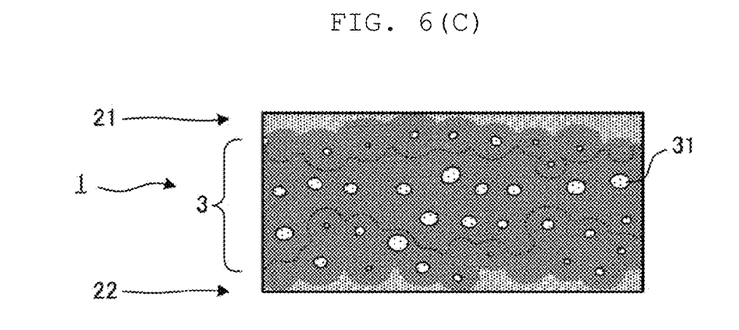

FIG. 6(C) is a schematic view showing a state in which an intermetallic compound is formed by the melts of the first foil 21 and the second foil 22 flowing into the voids 36. As shown in FIG. 6(C), the melts of the first foil 21 and the second foil 22 which have flowed into the voids 36 spread over the surfaces of the metal particles 31 to transform the vicinity of the surfaces of the metal particles 31 into an intermetallic compound by transient liquid phase diffusion bonding ("TLP bonding"). In addition, a metal element constituting each of the metal particles 31 also diffuses into the melts of the first foil 21 and the second foil 22 which have flowed into the voids 36 and is also transformed into an intermetallic compound. In this way, the film material 32 is further consumed, and the container 3 is transformed into an intermetallic compound leaving a center portion of each of the metal particles 31.

Figure 6D:
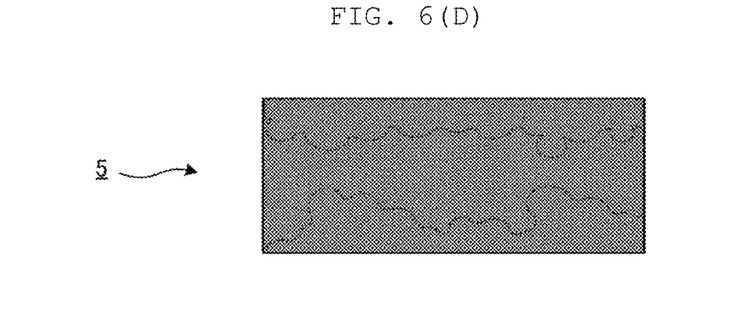
Figure 7:
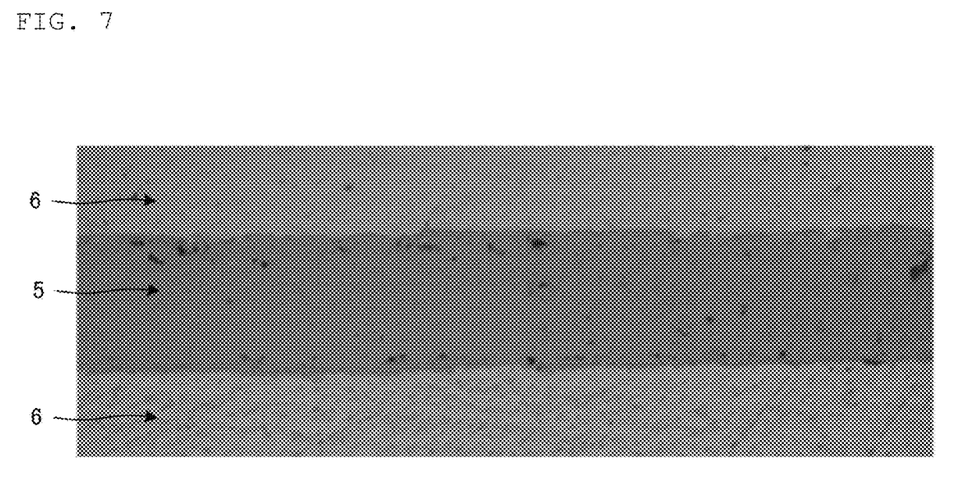
FIG. 7 is a microscopic image of the joint portion formed from the bonding member according to the first embodiment of the present invention.

FIG. 6(D) is a schematic view showing a state in which heating of the bonding member 1 is maintained for a further predetermined time. While the bonding member 1 is placed under a heated environment, transient liquid phase diffusion bonding progresses, and the vicinity of the center of each of the metal particle 31 is also transformed into an intermetallic compound. Among the melts of the first foil 21 and the second foil 22, an excessive portion that is not consumed in the formation reaction of the intermetallic compound flows out, for example, laterally from between electrodes to be bonded along with a residue of the film material 32 and the like. Consequently, the joint portion 5 having almost the same thickness as that of the container 3 in the bonding member 1 and being substantially entirely formed of an intermetallic compound is formed between the electrodes to be bonded. FIG. 7 is a microscopic image showing a sample cross section in which electrodes 6 to be bonded are bonded by the joint portion 5 formed from the bonding member 1 according to the present embodiment. In the sample, the joint portion 5 substantially entirely formed of an intermetallic compound is formed.

The joint portion 5 is formed from the bonding member 1 of the present embodiment through the reaction as described above. In the process of this reaction, as described above, the melts of the first foil 21 and the second foil 22 flow into the voids 36, so that a dense structure can be achieved in which the voids 36 are filled in substantially the entire joint portion 5 formed from the bonding member 1.

In addition, as described above, a large amount of the melt is supplied from the first foil 21 and the second foil 22, so that the first metal body and the second metal body in an amount required to transform the third metal body of the metal particles 31 into an intermetallic compound are supplied. In addition, the metal particles 31 are present dispersedly in the film material 32 and the intermetallic compounds 33 and 34. Accordingly, an area where the melts of the first metal body and the second metal body are in contact with the metal particles 31 becomes wide, and the formation reaction of the intermetallic compound proceeds efficiently. That is, the rate of the formation reaction of the intermetallic compound is improved. Accordingly, it is possible to make substantially the entire joint portion 5 formed from the bonding member 1 into a homogeneous structure composed of an intermetallic compound.

In the above-described bonding member 1, it is preferable that the mixing ratio of the first metal body or the second metal body and the third metal body is in the range of 50:50 to 99:1 by weight ratio. This is because if the mixing amount of the third metal body is too large, unreacted third metal body components may remain in the joint portion 5 formed from the bonding member 1, so that a homogeneous structure may not be obtained, or the joint portion may become porous and may not have a dense structure.

In the above-described bonding member 1, the metal particles 31 have an average particle size (D90) of preferably not less than 0.1 μm and not more than 45 The average particle size (D90) in the present invention means a particle size at an integrated value of 90%, which is obtained by analyzing particle size distribution of metal particles (for example, approximately 50 particles) in a microscopic image of a sample cross section. The average particle size of the metal particles 31 in the bonding member 1 is smaller than the average particle size of the metal particles 31 in the material stage before manufacturing the bonding member 1, and therefore, the above-described numerical range corresponds to the fact that the metal particles 31 have an average particle size (D90) of not less than 0.1 μm and not more than 55 μm in the material stage (preparation step S1) before manufacturing the bonding member 1. The average particle size (D90) of the metal particles 31 in the material stage corresponds to a particle size at an integrated value of 90% in particle size distribution obtained by a laser diffraction/scattering method. If the average particle size of the metal particles 31 is smaller than the lower limit of the numerical range described above, many surface oxides are formed by an increase in a ratio of the surface areas of the metal particles 31, so that the wettability with the melts of the first metal body and the second metal body decreases to suppress the reaction. If the average particle size of the metal particles 31 is larger than the upper limit of the numerical range described above, the center portion of each of the metal particles 31 is less likely to change into an intermetallic compound. For these reasons, unreacted third metal body components may remain in the joint portion 5 formed from the bonding member 1, so that a homogeneous structure may not be obtained, or the joint portion may become porous and may not have a dense structure.

In the bonding member 1 according to the present embodiment, the joint portion 5 having a homogeneous structure is obtained, so that Kirkendall voids to be generated inside the joint portion 5 due to a difference in diffusion rate between dissimilar metals are less likely to be generated, and the risk of breakage or cracks at the joint portion 5 due to the growth of the Kirkendall voids is low. In the bonding member 1 according to the present embodiment, the joint portion 5 having a dense structure can be obtained, and therefore a bonding target can be firmly bonded.

Next, a bonding member according to a second embodiment will be described.

Figure 8A:
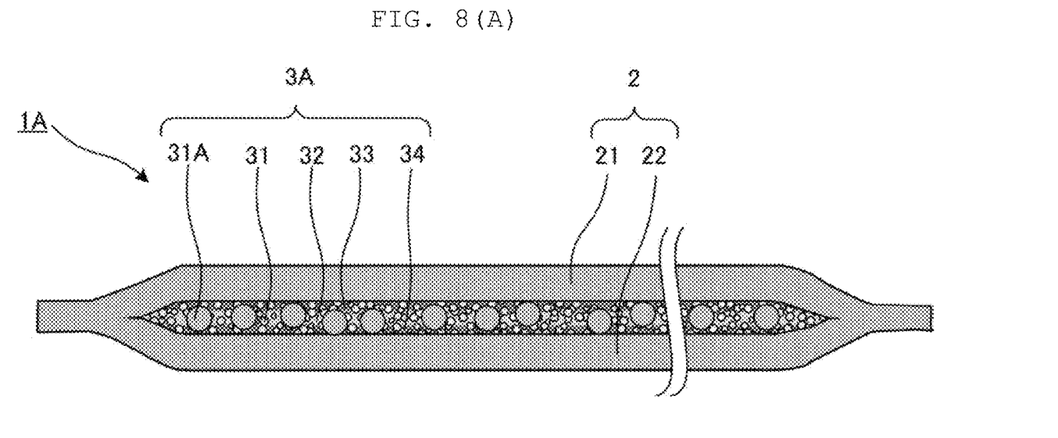
FIG. 8(A) is a schematic cross-sectional view of a bonding member according to a second embodiment of the present invention.
Figure 8B:
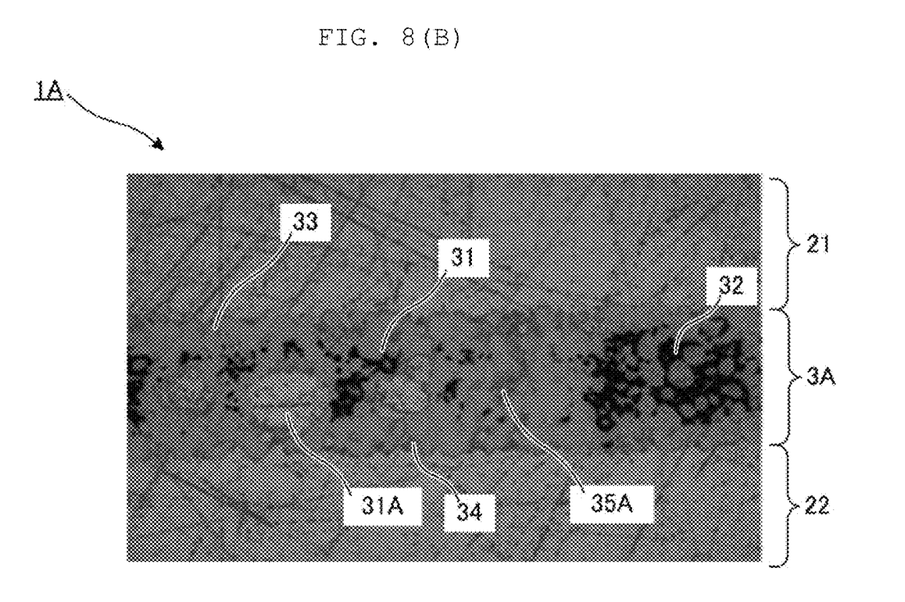
FIG. 8(B) is a microscopic image of the bonding member according to the second embodiment of the present invention.

FIG. 8(A) is a schematic cross-sectional view of a bonding member 1A according to a second embodiment. FIG. 8(A) is a microscopic image when viewing a sample cross section of the bonding member 1A.

The bonding member 1A includes a first foil 21, a second foil 22, and a container 3A. The container 3A includes first metal particles 31, second metal particles 31A, a film material 32, and intermetallic compounds 33 and 34. The second metal particle 31A is entirely constituted of a fourth metal body. The fourth metal body is formed of the same kind of metal material as the first foil 21 and the second foil 22, for example, Sn pure metal or a Sn-based alloy.

In this configuration, the second metal particles 31A react with the first metal particles 31 also around the second metal particles 31A, so that formation of an intermetallic compound 35A is promoted. Accordingly, in the container 3A, the intermetallic compounds 33, 34, and 35A are continuously connected from a region close to the first foil 21 to a region close to the second foil 22, and the entirety in the thickness direction is strongly bound mainly due to metal bonding. Thus, according to the bonding member 1A according to the second embodiment, the first foil 21 and the second foil 22 are much less likely to be peeled off than the first embodiment.

As described in each of the above embodiments, the present invention can be implemented; however, the description in each embodiment is to be considered in all respects as illustrative and not limiting. The scope of the present invention is indicated by the appended claims rather than by the above embodiments, and all changes which come within the meaning and range of equivalency of the claims are intended to be embraced therein.

DESCRIPTION OF REFERENCE SYMBOLS

1: Bonding member
2: Package
3: Container
5: Joint portion
6: Electrode
21: First foil
22: Second foil
31: Metal particles
32: Film material
33, 34: Intermetallic compound
35: Paste
36: Void
41: First region
42: Second region
43: Third region

The invention claimed is:

1. A bonding member comprising:
a first metal layer;
a second metal layer; and
a third layer provided between the first metal layer and the second metal layer,
wherein
an outer edge portion of the first metal layer and an outer edge portion of the second metal layer as viewed in a thickness direction thereof are adhered to each other, and
the third layer includes:
a film material;
first metal particles of having a melting point higher than a melting point of the first metal layer and a melting point of the second metal layer;
a first intermetallic compound interposed between and formed from a first reaction between the first metal layer and the first metal particles of the third layer; and
a second intermetallic compound interposed between and formed from a second reaction between the second metal layer and the first metal particles of the third layer,
wherein the first metal layer and the first metal particles of the third layer are bonded with the first intermetallic compound, and
the second metal layer and the first metal particles of the third layer are bonded with the second intermetallic compound.

2. The bonding member according to claim 1, wherein the film material includes a flux.

3. The bonding member according to claim 1, wherein the first metal particles of the third layer have an average particle size (D90) of not less than 0.1 μm and not more than 45 μm.

4. The bonding member according to claim 1, wherein
the first metal layer is one of Sn pure metal and a Sn-based alloy;
the second metal layer is one of Sn pure metal and a Sn-based alloy; and
the first metal particles are one of a Cu—Ni-based alloy and a Cu—Mn-based alloy.

5. The bonding member according to claim 4, wherein the third layer further includes second metal particles of one of Sn pure metal and a Sn-based alloy.

6. The bonding member according to claim 1, wherein the third layer further includes:
second metal particles; and
a third intermetallic compound formed from a third reaction between the first metal particles and the second metal particles.

7. The bonding member according to claim 1, wherein the first metal layer and the second metal layer are different metals.

8. A method for manufacturing a bonding member, the method comprising:
preparing a first metal layer, a second metal layer, and a paste including first metal particles having a melting point higher than a melting point of the first metal layer and a melting point of the second metal layer, the first metal particles being dispersed in a film material;
applying the paste to at least one of the first metal layer and the second metal layer;
sandwiching the paste between the first metal layer and the second metal layer;
adhering an outer edge portion of the first metal layer to an outer edge portion of the second metal layer; and
heating at least one of the first metal layer and the second metal layer to a temperature lower than the melting points of the first metal layer and the second metal layer to react the first metal particles with the at least one of the first metal layer and the second metal layer to form at least one intermetallic compound.

9. The method for manufacturing a bonding member according to claim 8, further comprising applying a pressure between the first metal layer and the second metal layer to plastically deform the first metal layer and the second metal layer.

10. The method for manufacturing a bonding member according to claim 8, wherein when the paste is prepared, the first metal particles have an average particle size (D90) of not less than 0.1 μm and not more than 55 μm.

11. The method for manufacturing a bonding member according to claim 8, wherein both the first metal layer and the second metal layer are heated to the temperature lower than the melting points of the first metal layer and the second metal layer to react the first metal particles with the first metal layer to form a first intermetallic compound and to react the first metal particles with the second metal layer to form a second intermetallic compound.

12. The method for manufacturing a bonding member according to claim 8, wherein the film material includes a flux.

13. The method for manufacturing a bonding member according to claim 8, wherein
the first metal layer is one of Sn pure metal and a Sn-based alloy;
the second metal layer is one of Sn pure metal and a Sn-based alloy; and
the first metal particles are one of a Cu—Ni-based alloy and a Cu—Mn-based alloy.

14. The method for manufacturing a bonding member according to claim 13, wherein the paste further includes second metal particles of one of Sn pure metal and a Sn-based alloy.

15. The method for manufacturing a bonding member according to claim 11, wherein the paste further includes second metal particles, and the heating is conducted such that a third intermetallic compound is formed from a reaction between the first metal particles and the second metal particles.

16. The method for manufacturing a bonding member according to claim 8, wherein the first metal layer and the second metal layer are different metals.

* * * * *